US 6,723,151 B2

(12) United States Patent
Tanaka et al.

(10) Patent No.: US 6,723,151 B2
(45) Date of Patent: Apr. 20, 2004

(54) GAS REMOVAL METHOD AND GAS REMOVAL FILTER

(75) Inventors: Akira Tanaka, Tokyo (JP); Yoko Suzuki, Tokyo (JP); Takashi Kishi, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/254,537

(22) Filed: Sep. 26, 2002

(65) Prior Publication Data

US 2003/0056646 A1 Mar. 27, 2003

(30) Foreign Application Priority Data

Sep. 27, 2001  (JP) ........................................ 2001-298411

(51) Int. Cl.⁷ .......................... B01D 53/04; G01N 27/04
(52) U.S. Cl. ........................ 95/3; 95/10; 95/14; 95/90; 96/111; 55/385.1; 55/385.4; 454/187; 73/74; 206/710
(58) Field of Search .............................. 95/2, 3, 6, 7, 8, 95/10, 14, 90; 96/109, 111, 112, 117.5; 55/385.1, 385.2, 385.4; 454/187; 73/73, 74; 206/710, 711; 118/715

(56) References Cited

U.S. PATENT DOCUMENTS

| 3,172,037 A | 3/1965 | Pfeiffer ........................ 324/30 |
| 3,618,769 A | * 11/1971 | Iglesias ........................ 210/85 |
| 6,284,020 B1 | * 9/2001 | Mizuno et al. ................ 95/26 |
| 6,364,922 B1 | * 4/2002 | Tanaka et al. ............. 55/385.1 |
| 6,521,007 B1 | * 2/2003 | Tanaka et al. ............. 55/385.2 |
| 2002/0112605 A1 | * 8/2002 | Motouji et al. ................... 95/8 |

FOREIGN PATENT DOCUMENTS

| EP | 1002582 A1 | * 5/2000 |
| JP | 02026612 | 1/1990 |
| JP | 05-107239 | 4/1993 |
| JP | 08-055774 | 2/1996 |
| JP | 10-137522 | 5/1998 |
| JP | 10-174839 | 6/1998 |
| JP | 10-174888 | 6/1998 |
| JP | 10-230126 | 9/1998 |
| JP | 2980124 | 9/1999 |
| JP | 2001-000821 | 1/2001 |
| JP | 2001-252518 | 9/2001 |

* cited by examiner

Primary Examiner—Frank M. Lawrence
(74) Attorney, Agent, or Firm—Westerman, Hattori, Daniels & Adrian, LLP

(57) ABSTRACT

A gas removal filter has an ion exchanger for adsorbing a gas and at least a pair of electric resistance measuring electrodes disposed on the ion exchanger. By measuring a change in the electric resistance between at least the pair of electric resistance measuring electrodes disposed on the ion exchanger, it is possible to estimate an ion exchange group consumption ratio of the ion exchanger. The ion exchange group consumption ratio of the ion exchanger can be detected in a short period of time, and a remaining adsorption capability of the ion exchanger can be known with ease.

20 Claims, 11 Drawing Sheets

F I G. 1 3
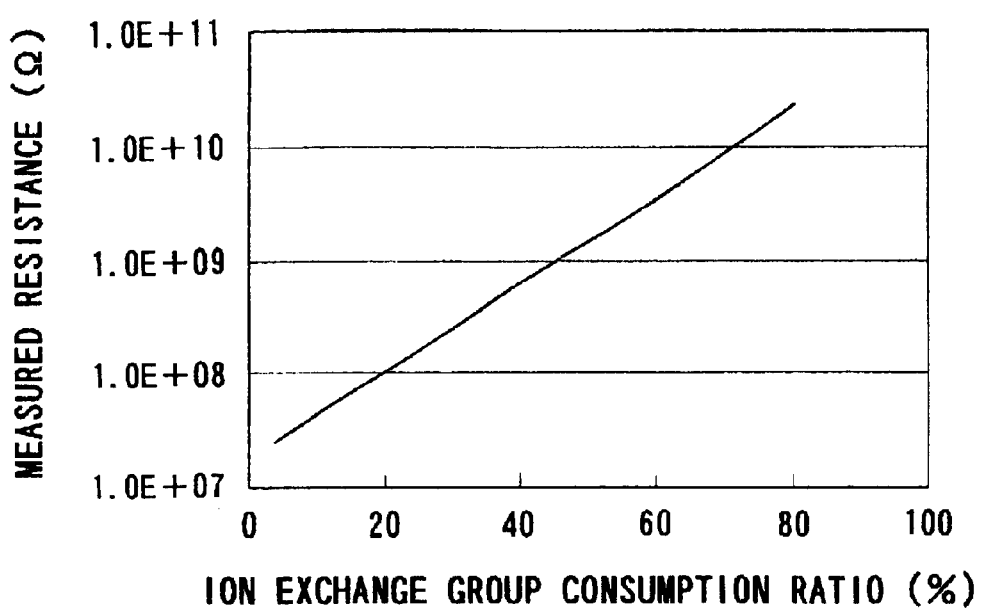

GAS REMOVAL METHOD AND GAS REMOVAL FILTER

BACKGROUND OF THE INVENTION

1. Field of the Invention

The present invention relates to a gas removal filter, and more particularly to an apparatus for and a method of estimating the ion exchange group consumption ratio of an ion exchanger for use in gas adsorption applications.

2. Description of the Related Art

Heretofore, the service life of an ionic gas adsorption filter has been managed by any one of the following processes:

(1) The total amount of a gas adsorbed by the filter is periodically integrated from the concentration of the gas on the inlet side of the filter and the rate of air flowing through the filter, and then compared with a known absorption limitation for judging the service life of the filter.

(2) The concentration of the gas on the inlet side of the filter and the concentration of the gas on the outlet side of the filter are periodically measured to confirm a reduction in the gas removal capability of the filter.

(3) It is confirmed whether or not the concentration of the gas on the outlet side of the filter is of a management value or lower.

The concentration of a gas is generally measured by an analyzer such as an ion chromatograph, a monitor for detecting a pH change, or a glass tube (detecting tube) filled with a detecting agent. While all the above processes for managing the service life of a gas removal filter are based on the measurement of the concentration of a gas, if the concentration of a gas to be measured is lower than 10 $\mu g/m^3$, then the measurement needs to rely on an analyzer which is capable of analyzing a trace amount of gas. However, such an analyzer is expensive and requires an operator who is knowledgeable in analytic processes for its operation though the analyzer is characterized by high analyzing accuracy.

SUMMARY OF THE INVENTION

It is therefore an object of the present invention to provide a gas removal filter which is capable of detecting the ion exchange group consumption ratio of an ion exchanger without a short period of time and easily detecting a remaining adsorption capability without the need for measuring a gas concentration.

A gas removal filter according to the present invention has an ion exchanger for adsorbing a gas and at least a pair of electric resistance measuring electrodes disposed on the ion exchanger.

By measuring a change in the electric resistance between at least the pair of electric resistance measuring electrodes disposed on the ion exchanger, it is possible to estimate an ion exchange group comsumption ratio of the ion exchanger. The ion exchange group consumption ratio of the ion exchanger can be detected in a short period of time, and a remaining adsorption capablility of the ion exchanger can be known with ease.

A removal method according to the present invention comprises the steps of placing at least a pair of electrodes on a gas removal filter having an ion exchanger for measuring the electric resistance of the ion exchanger, measuring the electric resistance between the electrodes with electric resistance measuring means, and estimating an ion exchange group consumption ratio of the ion exchanger from a change in the electric resistance to manage a consumed quantity of an ion exchange group.

With the above method, it is possible to manage the service life of the gas removal filter easily withing a short period of time without the need for a gas analyzer for analyzing a trace amount of gas, such as an ion chromatograph, a gas chromatograph or the like. Thus, the cleanness of a clean room or the like can be managed with ease.

In the method of using a gas removal filter according to the present invention, it is preferable to adjust the humidity around the ion exchanger when the electric resistance of the ion exchanger is to be measured. Particularly when the humidity around the ion exchanger is adjusted to be low, the ion exchanger is not affected by moisture, and hence the ion exchange group consumption ratio of the ion exchanger can be estimated accurately.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a graph showing data similar to those of the graph shown in FIG. 12 in a different humidity atmosphere.

DETAILED DESCRIPTION OF THE PREFERRED EMBODIMENTS

Figure 1:
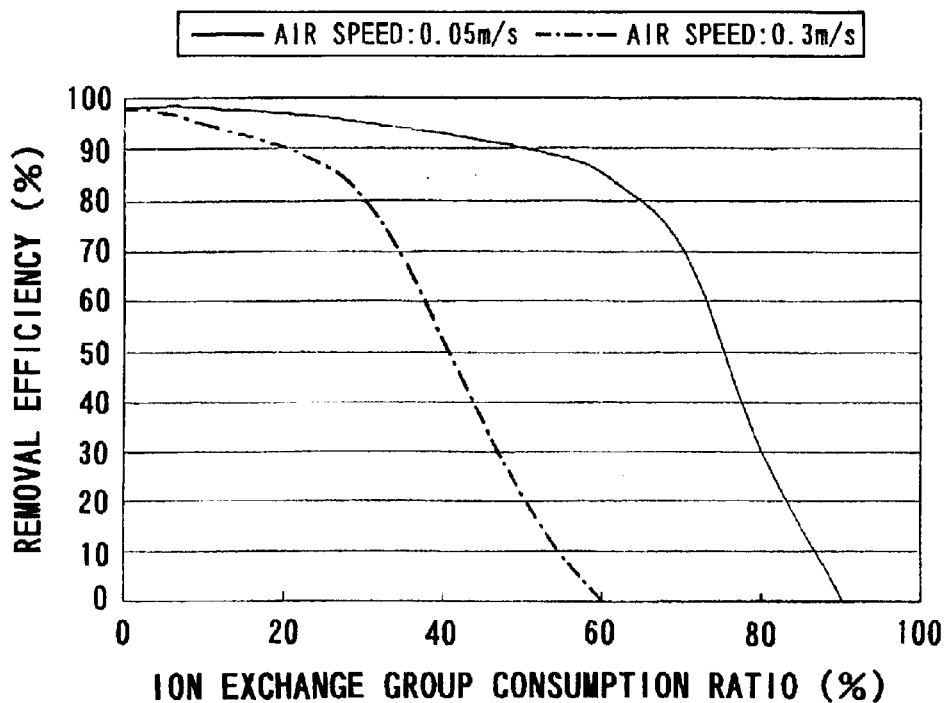
FIG. 1 is a graph showing the relationship between the ion exchange group consumption of an ion exchanger in a gas removal filter and the removal efficiency of the gas removal filter.
Figure 2:
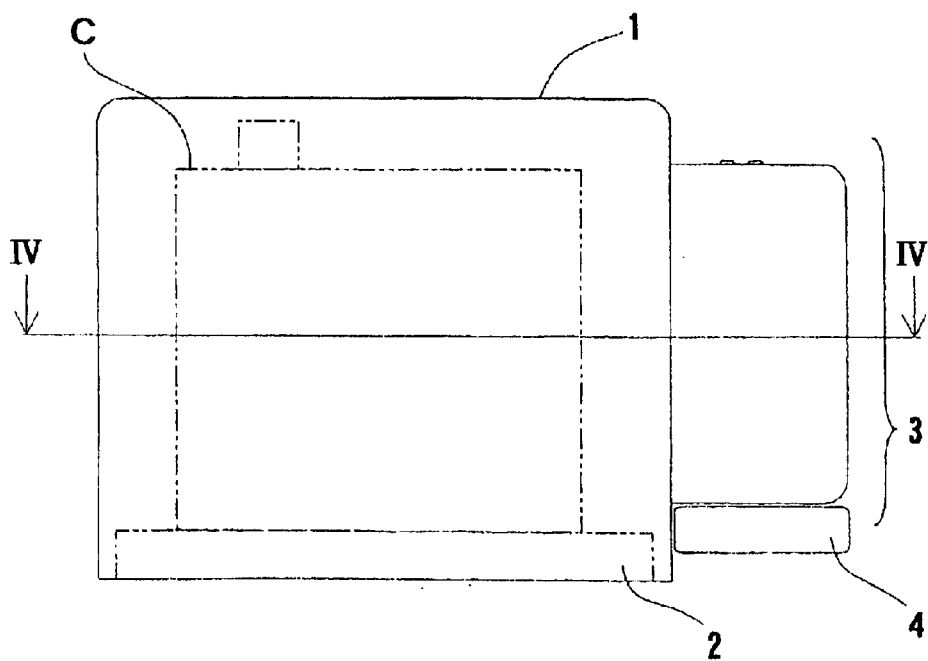
FIG. 2 is an elevational view of a clean box incorporating a gas removal filter according to a first embodiment of the present invention.
Figure 3:
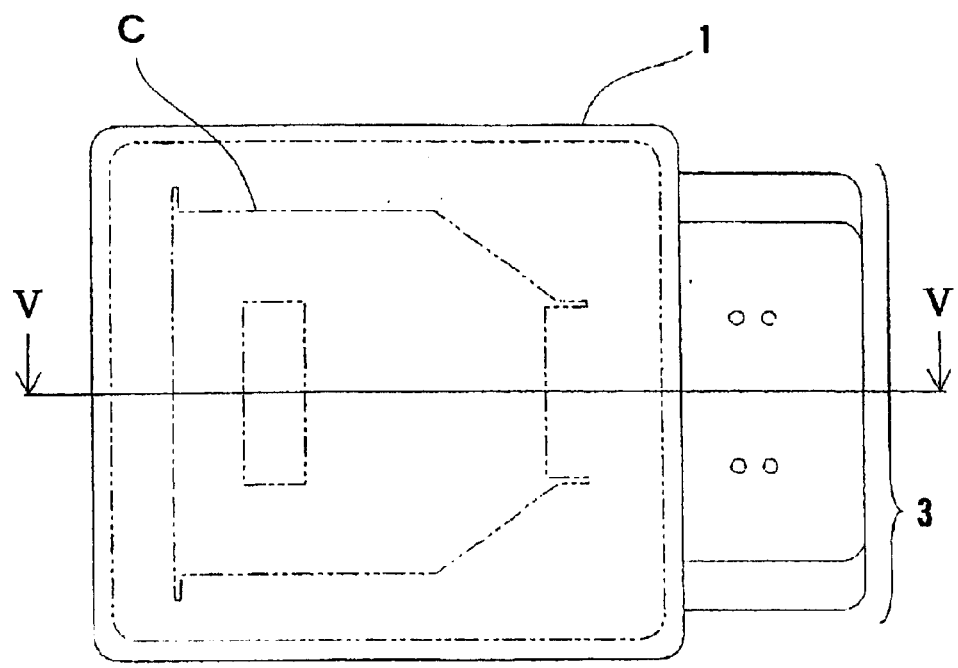
FIG. 3 is a plan view of the gas removal filter according to the first embodiment.
Figure 4:
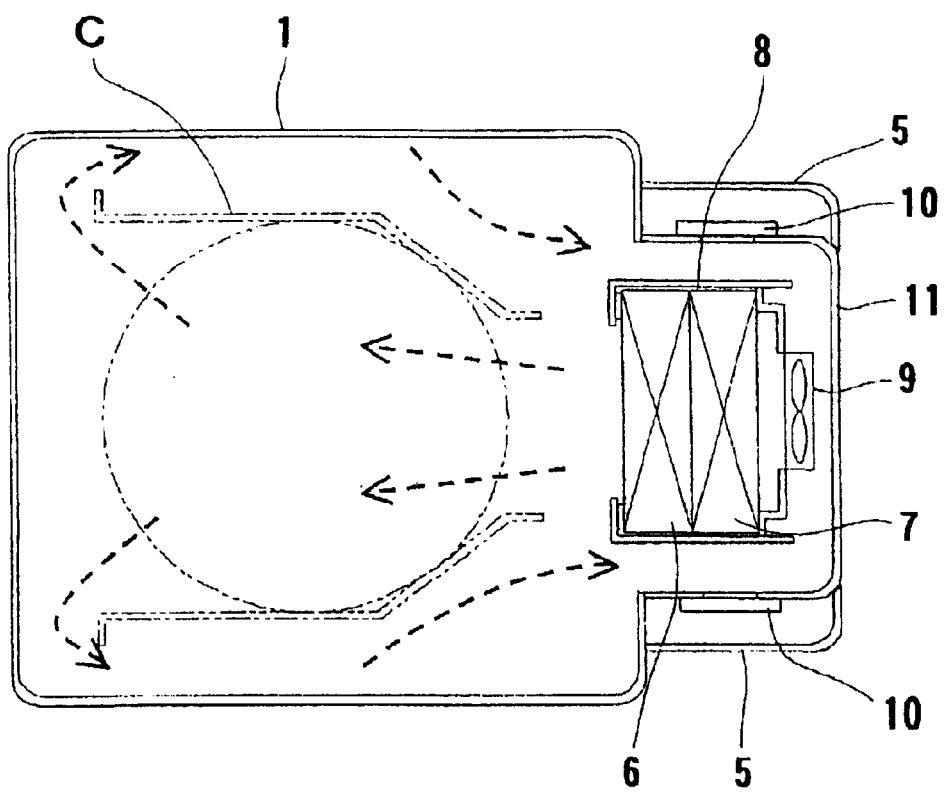
FIG. 4 is a cross-sectional view taken along line IV—IV of FIG. 2.
Figure 5:
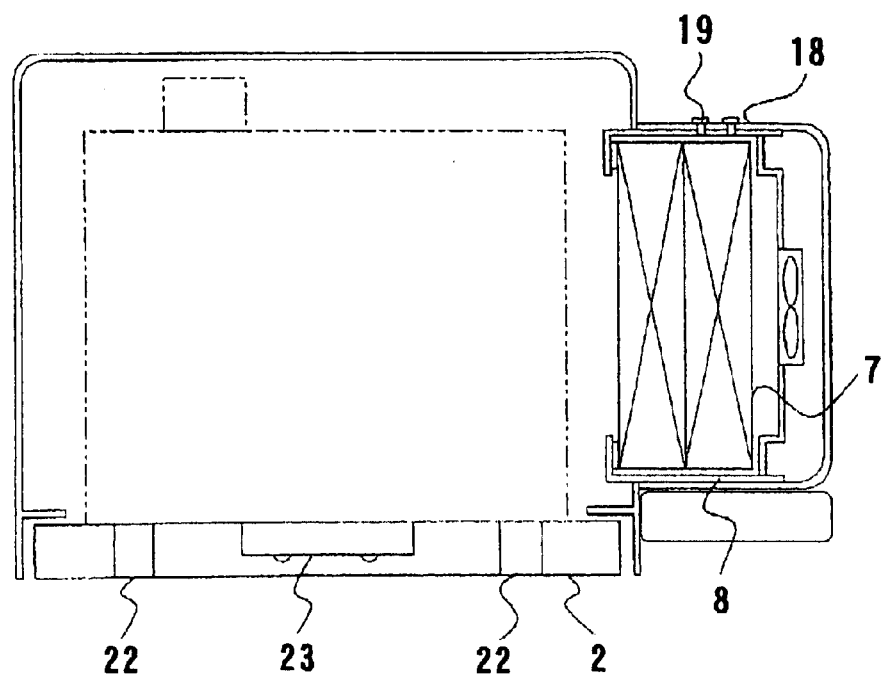
FIG. 5 is a cross-sectional view taken along line V—V of FIG. 3.

FIG. 1 shows the relationship between the ion exchange group consumption ratio of an ion exchanger in a gas removal filter and the removal efficiency of the gas removal filter. The removal efficiency of a gas removal filter can be determined by measuring the exchange capacity of the ion exchange group of an ion exchanger in the gas removal filter. Specifically, since a gas removal filter has its gas removal capability determined by the consumption ratio of the ion exchange group of the ion exchanger therein, if the consumption ratio of the ion exchange group is known, then it is possible to detect the service life (breakthrough) of the ion exchanger and also to detect the remaining adsorption capability thereof.

In FIG. 1, the horizontal axis represents the consumed proportion (consumption ratio) of the ion exchanger of the gas removal filter with respect to the total exchange capacity thereof, and the vertical axis represents the removal efficiency of the gas removal filter at a constant gas concentration. The data shown in FIG. 1 were obtained at two average speeds of air passing through the ion exchanger, i.e., 0.05 m/s (low speed) and 0.3 m/s (high speed). For example, if the removal efficiency of the gas removal filter is set to 70%, then it is estimated from FIG. 1 that the breakthrough, or the service life, of the gas removal filter at the air speed of 0.05 m/s will be reached when the consumption ratio is 70%.

The relationship between the ion exchange group consumption ratio of an ion exchanger in a gas removal filter and the removal efficiency of the gas removal filter is represented by a curve inherent in the filter material though it differs depending on the type of the ion exchanger (adsorbing material). Therefore, if the consumption ratio of the adsorption capacity of the ion exchanger can be measured, then it is possible to estimate the gas removal capability and service life of the ion exchanger.

The electric resistance of an ion exchanger varies depending on the amount of an ion exchange group contained in the ion exchanger. Consequently, if the electric resistance of an ion exchanger when it is not in use and the electric resistance thereof at the breakthrough (the expiration of the service life) are known, then it is possible to detect whether the expiration of the service life (the breakthrough) of the ion exchanger has been reached or not. Furthermore, the remaining adsorption capability which is unconsumed of the ion exchanger group can be estimated from the electric resistance of the ion exchanger.

The expiration of the service life (the breakthrough) of an ion exchanger according to the present invention, or the consumption ratio of the ion exchanger, can be measured with electrodes for measuring the electric resistance of the ion exchanger and a resistance measuring means for measuring the electric resistance between the electrodes, without the need for an analyzer such as a gas chromatograph or the like. In order to measure the pure electric resistance of the ion exchanger, it is preferable to provide an insulating means on the ion exchanger for preventing the ion exchanger from being affected by an electric conductor that is present in the vicinity of the ion exchanger. Since the electric resistance of the ion exchanger is largely affected by humidity, it is preferable to adjust the measuring environment for minimizing the effect of the ambient humidity on the ion exchanger.

A temperature adjusting means used in connection with the measurement of the electric resistance of the ion exchanger comprises a cold head source and a controller. The cold heat source may comprise a refrigerating machine, a cooling tower, a cooling water pump, a boiler, an oil tank, a heat storage unit, a hot water storage unit, a heat exchanger, a fan coil unit, or the like, which is used in combination with a ventilation/air supply means. The refrigerating machine operates in different refrigerating cycles including a vapor compression cycle, an absorption refrigerating cycle, an air cooling cycle, and a Peltier effect cycle. The refrigerant used in the refrigerating machine may be fluorocarbon, ammonia, water, or air. A humidity adjusting means used in connection with the measurement of the electric resistance of the ion exchanger comprises a combination of a humidifier and a dehumidifier. The humidifier may be an electric heater humidifier, a centrifugal humidifier, an ultrasonic humidifier, or the like. The dehumidifier may dehumidify the environment space by using the Peltier effect, cooling the environment and retrieving condensed water, using a solid polymer electrolytic membrane, or using a dehumidifying agent such as silica gel, zeolite, molecular sieve, or the like. Alternatively, the humidity of the environment space to be dehumidified may be adjusted by delivering dry air or an inactive gas into the environment space.

The controller may operate according to an automatic control process or a manual control process. Generally, the automatic control process is used. The automatic control process may be classified as a self-powered process, an electric process, an electronic process, a pneumatic process, an electronic/pneumatic process, or the like depending on how signals are transmitted and the type of an operating power source used. The self-powered process is a process in which a force obtained by a detector is directly transmitted to an adjusting unit and an operating unit for control operation without the need for a power source such as an electric or air source. The self-powered process is typically performed by a thermal expansion valve, a ball tap, a water fall prevention valve, or the like, for example. The electric process uses an electric signal transmission system and an electric operating power source, but requires no electronic amplifying mechanism in an adjusting mechanism. The electric process is widely used for simple process control and control without high accuracy. The electronic process uses an electronic amplifying mechanism in an adjusting mechanism, and amplifies a detected signal into an operating signal for moving an operating unit. The electronic process is capable of highly accurate control and complex control, and makes it possible for a control system to respond quickly. The pneumatic process uses compressed air for transmitting signals and actuating the operating unit, can generate large operating power and is widely used in large-scale buildings and constructions. The electronic/pneumatic process is based on a combination of electronic and pneumatic processes, and has an electronic detecting mechanism and a pneumatic operating system. The electronic/pneumatic process is used for highly accurate control. The process control for the temperature/humidify adjusting system is based on a feedback control process. The feedback control process may be performed in a two-position mode which is an on-off control mode, a multi-position mode, a single-speed mode, a proportional mode, an integral mode, and a differential mode. Any of the above processes may be used for the temperature and humidify adjusting means, and the control processes.

The ion exchanger for use in the gas removal filter is available in various types. For example, the ion exchanger may comprise a powdery or particulate ion exchange resin, hollow filaments, ion exchanger fibers, ion exchange nonwoven or woven fabric, a foamed body, or a processed product thereof. The ion exchanger according to the present invention may be of any of the above materials and processed products thereof, but should preferably be in the form of ion exchange fibers or a sheet such as of nonwoven fabric.

The ion exchange nonwoven fabric or fibers may contain an ion exchange group introduced by a radiation graft polymerization reaction. Specifically, a base material such as of organic polymer, e.g., a polymer such as polyethylene, polypropylene, or the like, fibers or woven fabric of natural polymer such as cotton, wool, or the like, is irradiated with a radiation such as an electron beam, a gamma ray, or the like to generate many active points which are highly reactive and referred to as radicals. A monomer is chemically coupled to these radicals to impart the properties of the monomer which are different from the properties of the base material. This technology is called graft polymerization because the monomer is grafted on to the base material. When a monomer having a sulfone group, a carboxyl group, an amino group, or the like which is an ion exchange group, e.g., styrene sodium sulfonate, acrylic acid, arylamine, or the like is joined to a polyethylene nonwoven fabric base material by radiation graft polymerization, a nonwoven-fabric ion exchanger whose ion exchange rate is much higher than ion exchange beads that are usually called an ion exchange resin is produced. Similarly, when an ion exchange group is introduced after chloromethyl styrene, glycidyl methacrylate, acrylonitrile, acrolein, or the like is joined to a base material by radiation graft polymerization, the base material is turned into an ion exchanger while retaining its shape.

The electrodes for measuring the electric resistance of the ion exchanger comprise one, two, or more pairs of electrodes applied to an ion exchanger in the form of a sheet. A voltage is applied between the electrodes, and a current flowing between the electrodes under the voltage is accurately measured. The electrodes on the ion exchanger are connected by wires to terminals on a frame of the gas removal filter, and the terminals of an electric resistance measuring means such as a resistance meter are brought into contact with the terminals on the frame of the gas removal filter to measure the electric resistance between the electrodes of the ion exchanger. The electrodes on the ion exchanger should preferably be made of an evaporated carbon film, a coated film of electrically conductive paste, or the like as these materials produce no contact resistance between the electrodes and the ion exchanger. At any rate, the electrode material should preferably be highly electrically conductive and should preferably be able to be firmly bonded to the ion exchanger without developing any appreciable contact resistance between the electrodes and the ion exchanger.

As described above, an ion exchanger to be measured needs to be measured for its own electric resistance with high accuracy. However, if there is an electrically conductive material is present in the vicinity of the ion exchanger, then the electric resistance to be determined may possibly be changed due to the presence of the electrically conductive material other than the ion exchanger. In order to cancel out the effect of the electrically conductive material and measure the electric resistance of the ion exchanger with high accuracy, it is preferable to apply an insulating means to the surface of the ion exchanger. If any electrically conductive material near the ion exchanger has no adverse effect, then such an insulating means is not required. The electric resistance measuring means should preferably be a resistance meter, and should preferably have a resistance measuring range from $10^3$ to $10^{15}$ $\Omega$.

Various resistance meters are present as commercially available products. Generally, the available resistance meters have applicable voltages ranging from DC 1V to DC 10,000 V and currents ranging from 1 A to $10^{-12}$ A, and can measure electric resistances ranging from 1 to $10^{16}$ $\Omega$. According to the Ohm's law, as an electric resistance to be measured is higher, a current to be measured which is supplied to the electric resistance is lower. Any insulation resistance meter which is capable of measuring very low currents of about $10^{-12}$ A is expensive. Therefore, it is preferable to adjust the DC resistance to a range from $10^3$ to $10^{11}$ $\Omega$, or more preferably to a range from $10^4$ to $10^9$ $\Omega$.

The electric resistance of the ion exchanger tends to vary due to the temperature and humidity in the measuring environment. In order to measure the electric resistance stably, it is necessary to keep the measuring environment within a certain temperature and humidity range. For example, if an ion exchanger as a sulfonic acid group, then the amount of bound water and the exchange capacity of the sulfonic acid group are correlated to each other. Since the amount of bound water varies depending on the humidity in the ambient environment, the electric resistance varies if the humidity in the measuring environment changes. Therefore, in order to inspect the exchange capacity of the ion exchange group accurately from the electric resistance of the ion exchanger, it is necessary to adjust the temperature and humidity in the measuring atmosphere within a certain range.

The resistance measuring environment may be adjusted in temperature steps of ±5° C. within a range from 15 to 30° C. and in relative humidity steps of ±5% in a range from 1 to 60%. The electric resistance should preferably be measured after the adjusted resistance measuring environment has been kept at least for a period of time ranging from 5 to 180 minutes. The humidity may be adjusted by using a humidifier and a dehumidifier or supplying dry air, an inactive gas, or a gas adjusted to a certain humidity to a space around the ion exchanger to be measured. It is preferable to provide a temperature/humidity measuring means for automatically or manually controlling the temperature and humidity of the measuring environment. The rate at which to supply dry air, an inactive gas, or a gas adjusted to a certain humidity may be controlled automatically or manually.

FIGS. 2 through 5 show a clean box incorporating a gas removal filter according to a first embodiment of the present invention. The clean box shown in FIGS. 2 through 5 is used to store or deliver semiconductor wafers or the like, for example, while keeping them in an extremely clean environment.

As shown in FIGS. 2 through 5, the clean box primarily comprises a casing 1 for accommodating a cassette C which holds an array of substrates such as semiconductor wafers or the like therein, a door 2 for hermetically covering an opening in the casing 1 through which the cassette C can be taken into and out of the casing 1, an air cleaner 3 housing a particle removal filter and a gas removal filter therein and connected to the casing 1, and outer covers 5 housing cables therein and connected to the air cleaner 3.

The air cleaner 3 comprises a particle removal filter 6 such as a HEPA filter or a ULPA filter, a filter case 8 housing a gas removal filter 7 which includes an ion exchanger according to the present invention, an air blower 9, dehumidifiers 10, and a filter unit cover 11 isolating these components from the outer environment. The gas removal filter 7 has an ion exchanger in the form of a sheet, and is associated with electrodes for measuring the electric resistance of the portion of the gas removal filter 7 between the electrodes. The door 2 has inlet and outlet ports 22 for replacing air in the clean box with fresh air, a means for measuring the temperature and humidity in the clean box, and a means 23 for transmitting information of the measured information to an external circuit.

Figure 6:
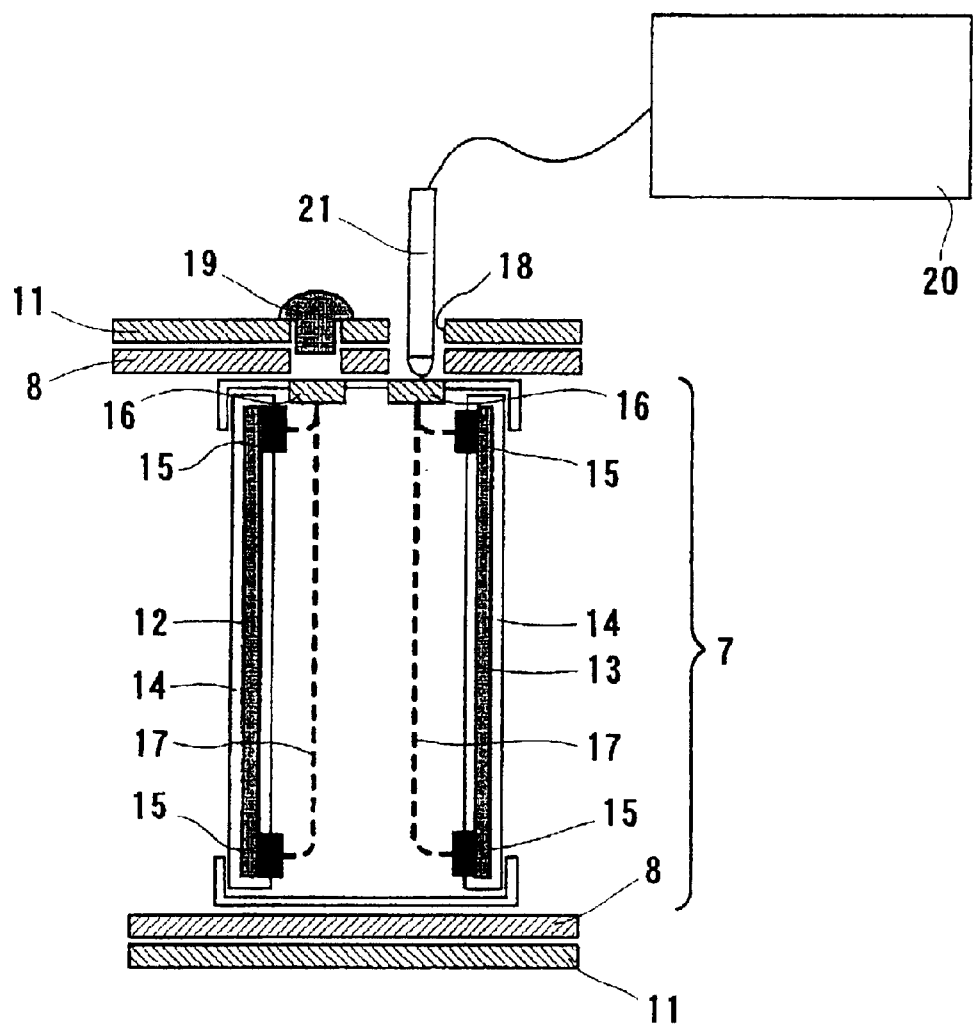
FIG. 6 is a cross-sectional view of the gas removal filter shown in FIGS. 4 and 5, with related parts being also illustrated.

FIG. 6 shows in cross section the gas removal filter 7 together with related parts. As shown in FIG. 6, the gas removal filter 7 has a cation exchanger 12 and an anion exchanger 13 which trap positive ions and negative ions, respectively, and remove them from air flows in the clean box. The cation exchanger 12 and the anion exchanger 13 are covered with respective insulating members 14 for protection against the effect of any electrically conductive materials which may be present near the clean box. Respective pairs of inner electrodes 15 are attached to the cation exchanger 12 and the anion exchanger 13 for measuring electric resistances thereof. External electrodes 16 are mounted on a frame of the gas removal filter 7 and electrically connected to the inner electrodes 15 by wires 17. Since the electric resistance of the ion exchangers may possibly be changed due to the humidity of the environment and an electrically conductive material applied thereto, an electrostatic nonwoven fabric or a filter or a particle removal means such as a HEPA filter or a ULPA filter may be disposed upstream of the cation exchanger 12 and the anion exchanger 13.

The filter case 8 and the filter unit cover 11 have through holes 18 defined therein for allowing a terminal 21 of a resistance meter 20 to contact the outer electrodes 16. Unless the electric resistance is measured, the through holes 18 are closed by plugs 19. For measuring the electric resistance of the cation exchanger 12 and the anion exchanger 13, the plugs 19 are removed to expose the outer electrodes 16, and the terminal 21 of the resistance meter 20 positioned outside of the clean box is brought into contact with outer electrodes 16 to measure the electric resistance between the electrodes 15 on the cation exchanger 12 and the anion exchanger 13.

Figure 7:
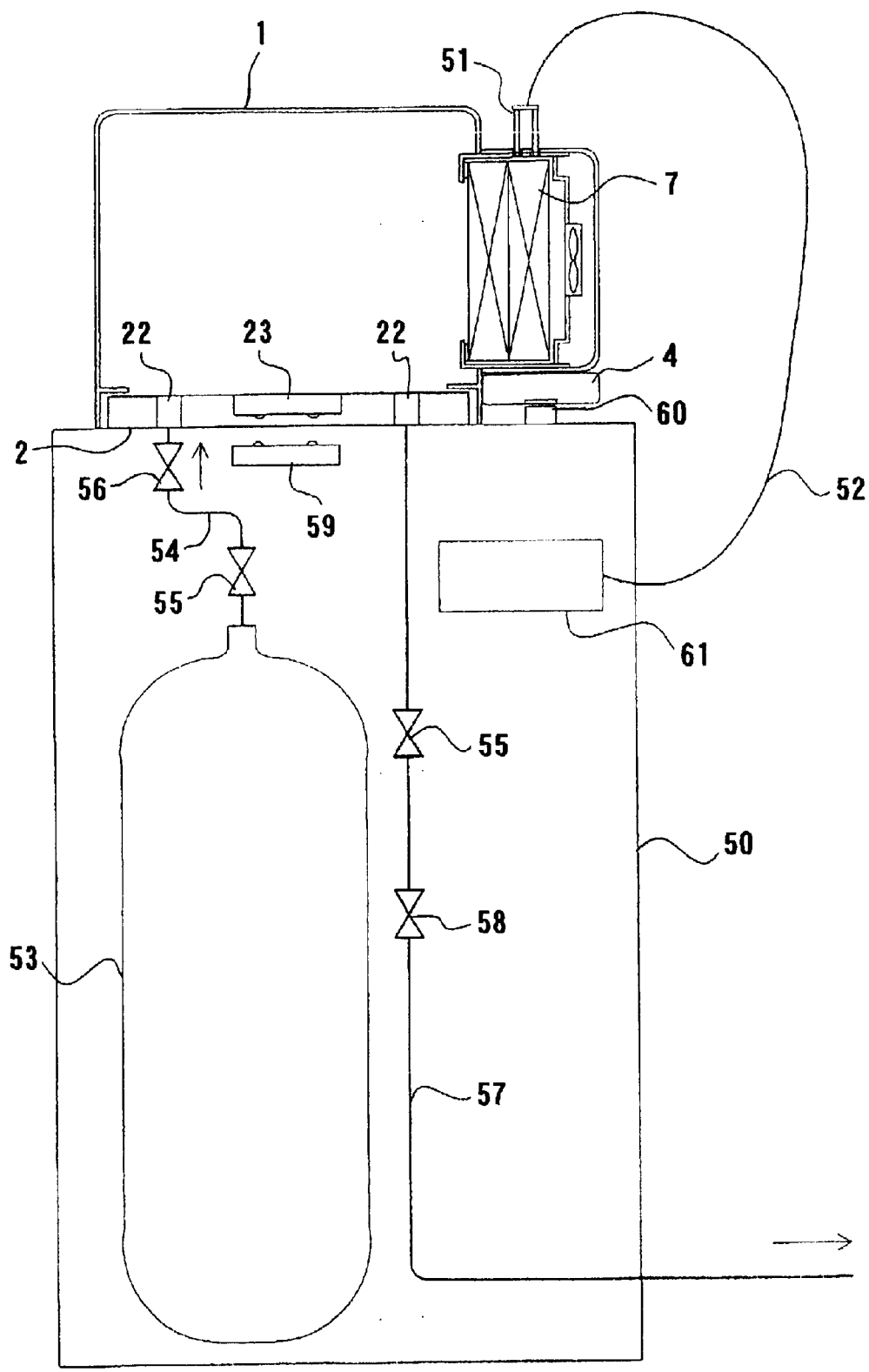
FIG. 7 is a view showing an apparatus for measuring the service life of the gas removal filter which is incorporated in the clean box.

FIG. 7 shows an apparatus for measuring the service life of the gas removal filter 7, the apparatus having an air adjusting function. The apparatus comprises a housing 50, a measuring terminal 51, and a wiring means 52. The housing 50 accommodates therein a humidity adjusting means comprising a high-pressure container 53 filled with an inactive gas or dry air, a supply conduit means 54 connecting the high-pressure container 53 to the inlet port 22 of the clean box, an opening and closing means 55 connected to the supply conduit means 54, a supply gas rate adjusting means 56 connected to the supply conduit means 54 for adjusting the rate of the inactive gas or dry air supplied from the high-pressure container 53, a discharge conduit means 57 for discharging the inactive gas or dry air from the outlet port 22 of the clean box, an opening and closing means 55 connected to the discharge conduit means 57, and a discharge gas rate adjusting means 58 connected to the discharge conduit means 57 for adjusting the rate of the inactive gas or dry air discharged from the outlet port 22 of the clean box.

The housing 50 also has a communication means 59 for receiving temperature and humidity information in the clean box, ID information of the clean box, and history information of substrates in the clean box via a wireless or wired link with the means 23 on the clean box, and a power supply unit 60 for supplying electric energy to the clean box. The ID information of the clean box represents a number for identifying the clean box among many containers present in the semiconductor fabrication factory, and is subject to centralized management by a production management system in the semiconductor fabrication factory. The housing 50 also accommodates a controller 61 for calculating the service life of the ion exchangers based on the temperature and humidity in the clean box and the electric resistance of the ion exchangers, and recording control and measurement information. The measurement information to be recorded represents the ID information of the clean box, the substrate processing history, the year, month, and date of measurement, the apparatus ID number, the temperature and humidity in the clean box, the electric resistance of the ion exchangers, the calculated ion exchanger consumption ratio, the judged results, etc. The control and measurement information may be transmitted to a host computer in the semiconductor fabrication factory for the management of the filter service life.

Operation of the apparatus for measuring the service life of the gas removal filter 7 will be described below.

When the clean box is seated on the apparatus, the power supply unit 60 is electrically connected to a terminal on the clean box, which starts to operate with electric energy supplied from the power supply unit 60. In order to stir and mix the gas in the clean box, the air blower 9 in the clean box should preferably be operated when the filter service life is measured. If the clean box incorporates a dehumidifying means therein, then the dehumidifying means should also preferably be operated to maintain a desired level of humidity in the clean box.

The means 23 on the clean box transmits temperature and humidity information in the clean box to communication means 59 of the apparatus. If the temperature and humidity in the clean box fall within given ranges, e.g., if the temperature in the clean box is in the range from 20 to 25° C. and the relative humidity in the clean box is in the range from 5 to 15%, then the apparatus enters a standby mode for measuring the electric resistance after it has operated a certain period of time. Then, the apparatus is automatically or manually operated to measure the electric resistance of the ion exchangers, and the controller 61 calculates and judge the service life of the ion exchangers. The electric resistance may be measured for one of the ion exchangers at a time or all the ion exchangers simultaneously. If the humidity in the clean box falls outside of the desired range, then the humidity adjusting means supplies an inactive gas or dry air to the clean box. After the humidity in the clean box reaches the desired range, the apparatus starts measuring the electric resistance. In the present embodiment, the high-pressure container 53 is illustrated as part of the humidity adjusting means, a utility facility in the semiconductor fabrication factory may be used instead of the high-pressure container 53 for supplying an inactive gas or dry air to the clean box. The means for measuring the temperature and humidity in the clean box may be associated with the apparatus, rather than with the clean box. If the means for measuring the temperature and humidity in the clean box may be associated with the apparatus, then some parts and communication means in the clean box may be eliminated. If the clean box has a dehumidifying means, then the humidity adjusting means may be dispensed with.

In the above embodiment, the measuring terminal 51 is connected to an upper wall of the gas removal filter 7. However, the through holes 18 for the measuring terminal may be defined in a side wall, a lower wall, or a rear wall of the clean box, and the measuring terminal 51 may be positioned accordingly for connection though the through holes 18 thus defined.

The measuring terminal 51 may be positioned on a portion of the clean box which is engageable with the apparatus, and when the clean box is placed on the apparatus housing 50, the measuring terminal 51 may automatically be connected to a resistance measuring terminal through the through hole 18. Alternatively, the measuring terminal 51 may be concealed by a cover on the apparatus housing 50, and may be connected to a resistance measuring terminal in the clean box in response to the seating of the clean box on the apparatus or a command for measuring the electric resistance.

Figure 8:
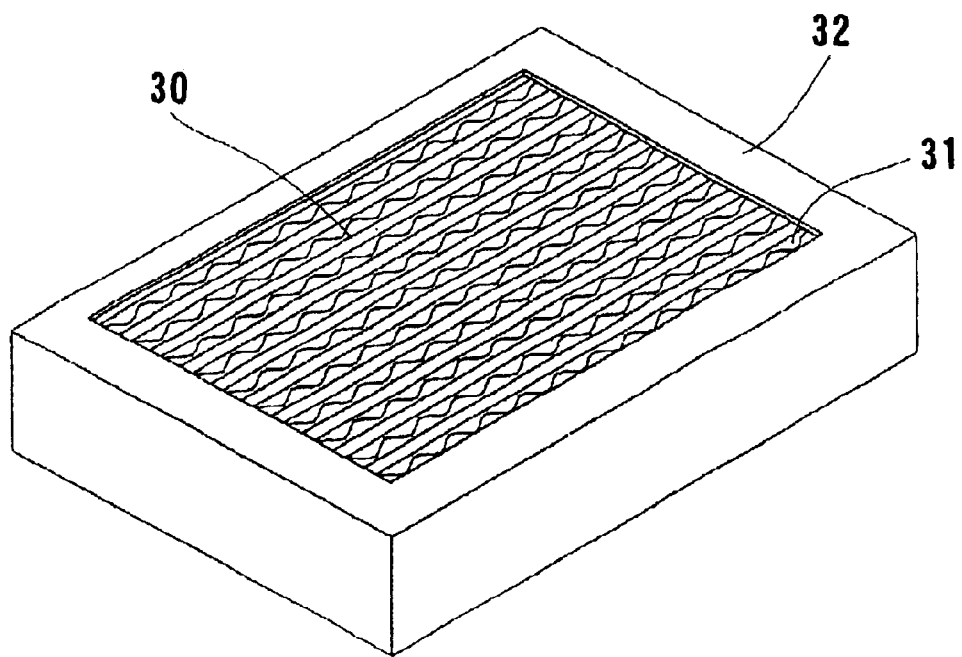
FIG. 8 is a perspective view of a corrugated gas removal filter according to a second embodiment of the present invention.
Figure 9:
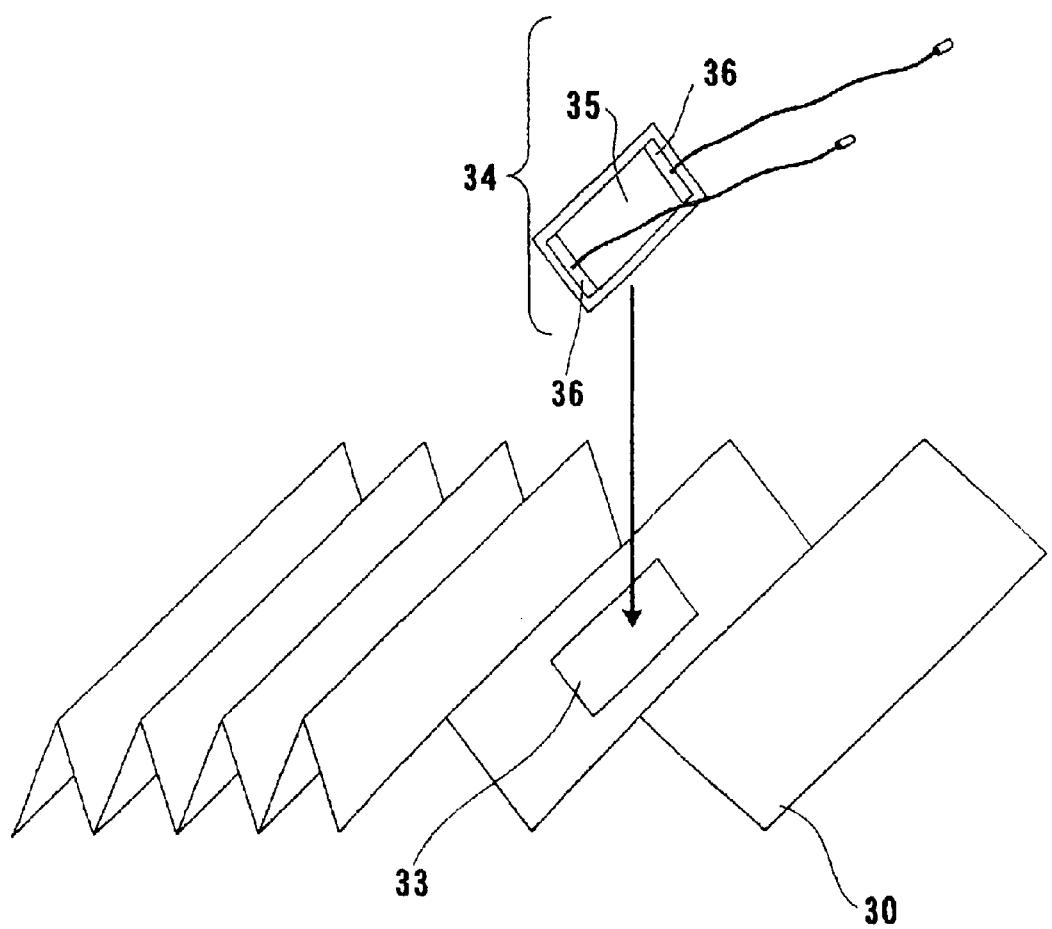
FIG. 9 is a perspective view of a portion of the corrugated gas removal filter shown in FIG. 8, together with an ion exchanger specimen for measuring an electric resistance.

FIGS. 8 through 11 show a corrugated gas removal filter according to a second embodiment of the present invention. As shown in FIG. 8, the corrugated gas removal filter according to the second embodiment comprises an ion exchanger 30 in the form of corrugated sheets, separators 31 each inserted between adjacent ones of the corrugated sheets for providing uniform air passages therebetween, and an outer frame 32 holding the ion exchanger 30 and the separators 31 which are bonded together by an adhesive.

As shown in FIG. 8, an opening 33 is defined in a strip of the corrugated ion exchanger 30, and an electric resistance measuring unit 34 is placed in the opening 33. Specifically, the electric resistance measuring unit 34 comprises a sheet-like ion exchanger 35, which is of the same material and dimensions as the ion exchanger 30, is placed in the opening 33, and electrodes 36 are attached to the ion exchanger 35 for measuring the electric resistance of the ion exchanger 35.

Figure 10:
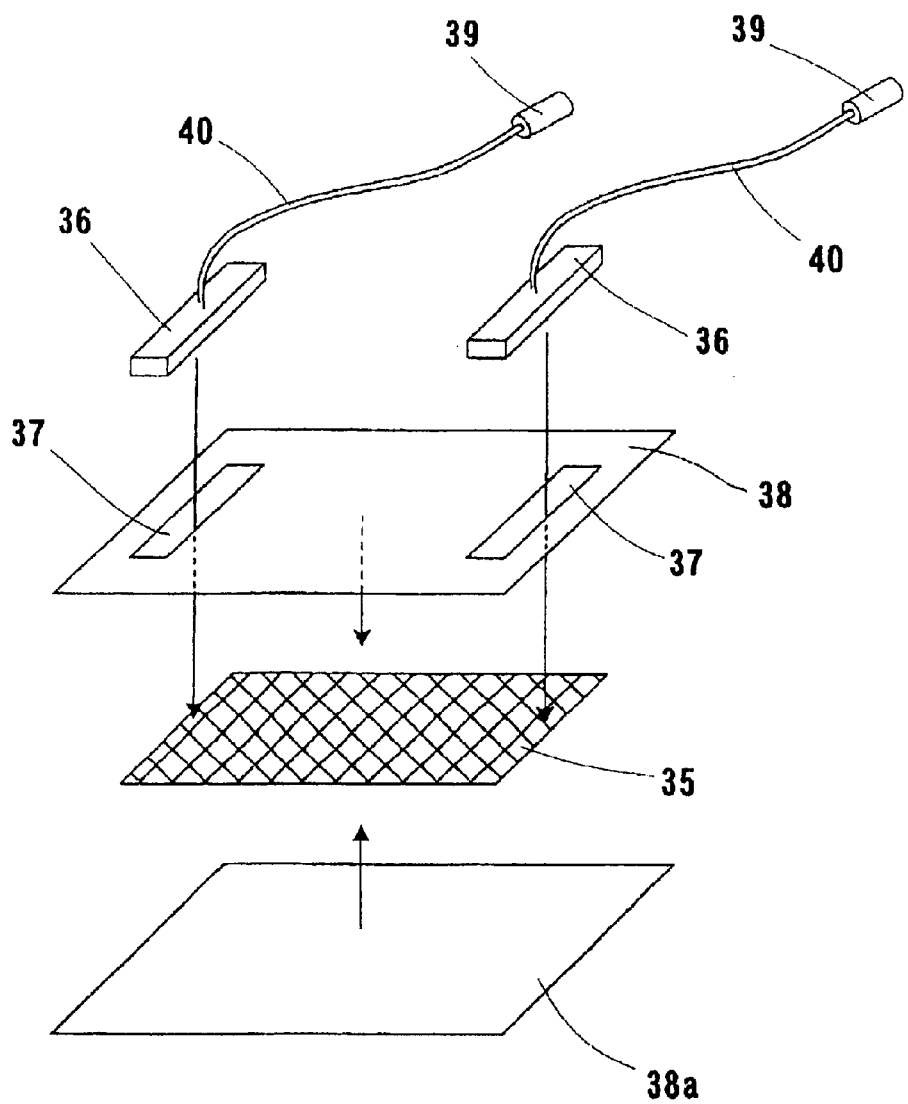
FIG. 10 is an exploded perspective view of the ion exchanger specimen shown in FIG. 9.

FIG. 10 shows the electric resistance measuring unit 34 in exploded perspective. As shown in FIG. 10, the electric resistance measuring unit 34 has the sheet-like ion exchanger 35 sandwiched between an insulating sheet 38 having openings 37 defined therein for passage of respective electrodes 36 therethrough and another insulating sheet 38a. The electrodes 36 are fixedly attached to the sheet-like ion exchanger 35 without no contact resistance developed therebetween. The electrodes 36 are electrically connected to respective terminals 39 through respective wires 40. The terminals 39 are disposed on the filter frame 32 shown in FIG. 8 for connection to respective terminals of an external resistance meter. The terminals 39 may alternatively be positioned on a duct of the like in the vicinity of the gas removal filter. At any rate, the consumption of the ion exchange group of the ion exchanger can easily be detected simply by measuring the electric resistance thereof without the need for removal of the gas removal filter.

The electric resistance measuring unit 34, which comprises an ion exchanger specimen of the same material as the ion exchanger to be measured, combined with electrodes, is attached to a portion of the ion exchanger to be measured. The electric resistance measuring unit 34 thus installed allows the consumption of the ion exchange group of the ion exchanger in the gas removal filter to be measured with ease. The second embodiment is easily applicable to a location where the gas removal filter is installed, e.g., a clean room, a semiconductor fabrication facility, a liquid crystal substrate fabrication facility, and an air-conditioning system for storage rooms for various substrates.

Figure 11:
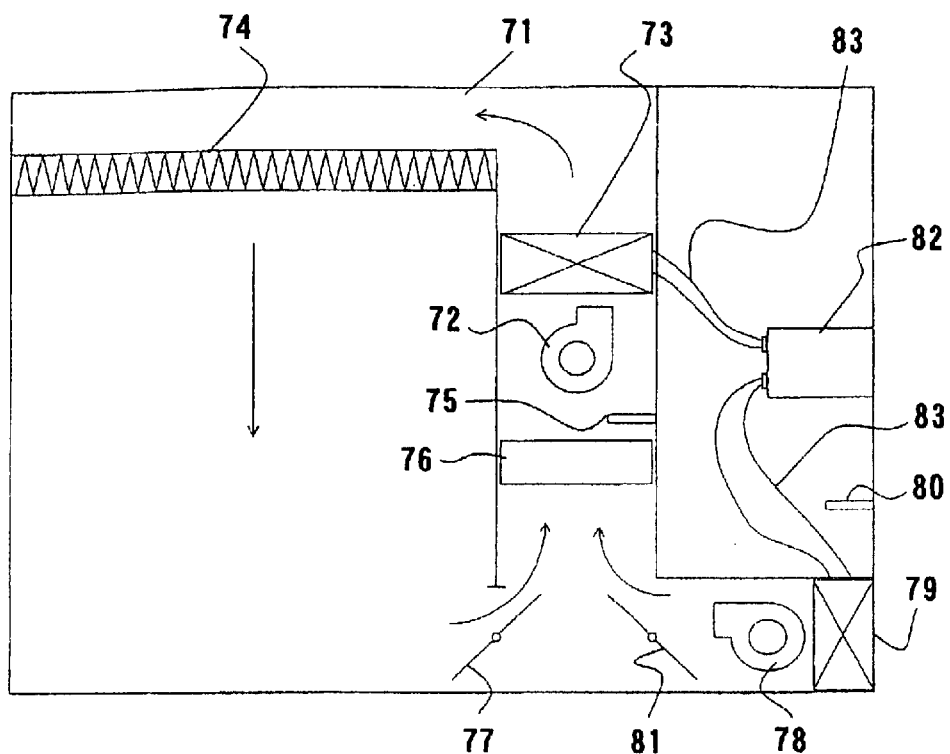
FIG. 11 is a view showing an apparatus for measuring the service life of the corrugated gas removal filter according to the second embodiment.

FIG. 11 shows by way of example the principles of the second embodiment as applied to air-conditioning ion exchange filters in a semiconductor fabrication apparatus 71. The semiconductor fabrication apparatus 71 has two air-conditioning systems, i.e., a circulating system for circulating air in the semiconductor fabrication apparatus 71 and an air intake system for introducing external air into the semiconductor fabrication apparatus 71. The circulating system comprises a first air blower 72, a circulating system gas removal filter 73, a particle removal filter 74, a first temperature/humidity measuring means 75, a temperature/humidity adjusting means 76, and a first air rate adjusting damper 77. The air intake system comprises a second air blower 78, an air intake system gas removal filter 79, a second temperature/humidity measuring means 80, and a second air rate adjusting damper 81. A service life measuring apparatus comprises a controller 82 and a wiring means 83. Each of the circulating system gas removal filter 73 and the air intake system gas removal filter 79 is combined with the electric resistance measuring unit 34, which is connected to the controller 82 by the wiring means 83. The temperature and humidity in the semiconductor fabrication apparatus 71 are controlled to be equal to or higher than those in a clean room, and kept at substantially constant levels. Therefore, the electric resistance of the ion exchange filters installed in the semiconductor fabrication apparatus 71 can continuously be measured, and hence the service life of those ion exchange filters can also continuously be measured. The controller 82 can record measured data as digital or analog data, and can send the recorded data to an external computer terminal in response to a request therefrom.

Figure 12:
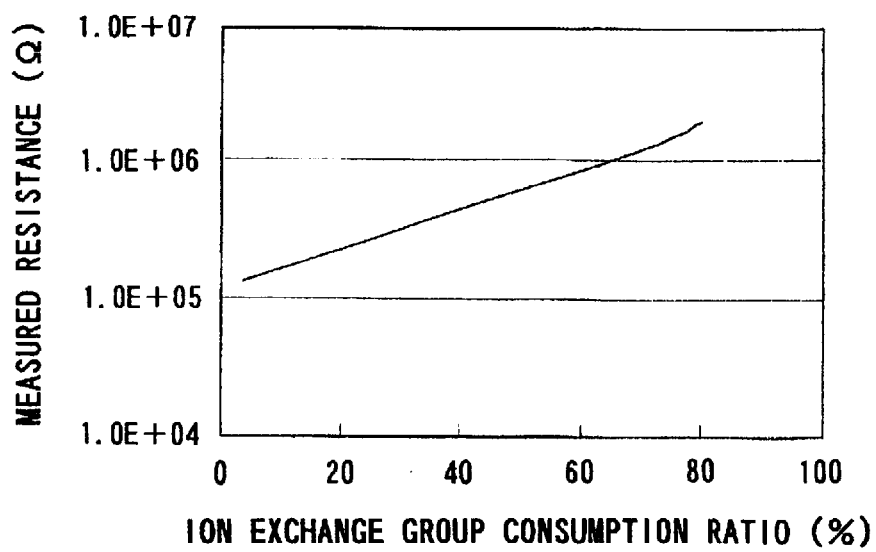
FIG. 12 is a graph showing the relationship between the ion exchange group consumption and measured electric resistance of a strong acid cation exchange nonwoven fabric.

FIGS. 12 and 13 show different data of the relationship between the ion exchange capacity of an ion exchanger and the electric resistance thereof. FIG. 12 shows the relationship between the ion exchange group consumption ratio of a strong acid cation exchange nonwoven fabric and the measured electric resistance thereof at an environment temperature of 23° C. and 50% RH. The ion exchange group consumption ratio C (%) is defined by the following equation:

$$C(P-L)/P \times 100$$

where P represents the total exchange capacity (equivalent amount) in an initial state, and L represents the remaining exchange capacity (equivalent amount) which is left after the ion exchanger has been used.

FIG. 13 shows the relationship between the ion exchange group consumption ratio C of the strong acid cation exchange nonwoven fabric and the measured electric resistance R thereof at an environment temperature of 23° C. and 3% RH. It can be seen from FIGS. 12 and 13 that the ion exchange group consumption ratio C and the measured electric resistance R are substantially linearly correlated to each other such that as the ambient humidity is lower, the electric resistance R is higher, resulting in a greater change in the electric resistance due to the consumption of the ion exchange group. Therefore, it is preferable to measure the electric resistance while keeping the ion exchanger at a low humidity for the purpose of measuring the consumption ratio of the ion exchange group with higher accuracy. With respect to the clean box according to the first embodiment, for example, it is preferable to keep the humidity in the clean box at a low level with the dehumidifier in the clean box and measure the electric resistance of the ion exchanger in such a low humidity environment.

The above embodiments have been described with respect to the means for measuring the electric resistance of the ion exchanger according to the present invention, as combined with the gas removal filter incorporated in the clean box and the corrugated gas removal filter for use in general air-conditioning systems. However, the principles of the present invention are also applicable to gas removal filters of various types. FIGS. 12 and 13 show the relationship between the ion exchange group consumption ratio of the cation exchange nonwoven fabric and the measured electric resistance thereof. However, the same substantially linear relationship also occurs with anion ion exchangers. Therefore, the present invention is applicable to various ion exchangers.

According to the present invention, as described above, it is possible to measure the electric resistance of an ion exchanger easily within a short period of time without the need for an analyzer for analyzing a trace amount of gas, such as a gas chromatograph or the like. Therefore, the consumption of the ion exchange group of the ion exchanger and the remaining adsorption capability thereof can be estimated easily within a short period of time. As a result, the replacement of a gas removal filter incorporating an ion exchanger can easily be managed for keeping various clean rooms at a desired level of cleanness.

Although certain preferred embodiments of the present invention have been shown and described in detail, it should be understood that various changes and modifications may be made therein without departing from the scope of the appended claims.

What is claimed is:

1. A gas removal method comprising:

using a gas removal filter having an ion exchanger;

measuring an electric resistance of the ion exchanger; and estimating an ion exchange group consumption ratio of the ion exchanger from the measured electric resistance.

2. A method according to claim 1, wherein said ion exchange group consumption ratio is estimated from a relationship, which has been acquired in advance, between an electric resistance and ion exchange group consumption of the ion exchanger.

3. A method according to claim 1, wherein said measuring the electric resistance comprises:

applying a pair of electrodes to said ion exchanger; and measuring the electric resistance between said electrodes with an electric resistance measuring unit.

4. A method according to claim 3, further comprising:

removing a portion of said ion exchanger as a specimen;

applying said electrodes to said specimen; and attaching said specimen to said ion exchanger where said portion thereof has been removed.

5. A method according to claim 1, further comprising:

adjusting a humidity around said ion exchanger when the electric resistance of the ion exchanger is to be measured.

6. A gas removal filter comprising:

an ion exchanger; and a measuring unit for measuring a change in an electric resistance of said ion exchanger which is caused when said ion exchanger adsorbs a gas.

7. A gas removal filter according to claim 6, wherein said measuring unit comprises:

at least a pair of electrodes applied to said ion exchanger.

8. A gas removal filter according to claim 6, wherein a portion of said ion exchanger is removed as a specimen, said measuring unit is applied to said specimen, and said specimen is attached to said ion exchanger where said portion thereof has been removed.

9. A gas removal filter according to claim 6, wherein said measuring unit is attached to said ion exchanger and is connected by wires to terminals on a frame of the gas removal filter, whereby the electric resistance of said ion exchanger can be measured through said terminals.

10. A gas removal filter according to claim 9, further comprising:

a resistance meter for measuring said electric resistance.

11. A gas removal filter according to claim 10, wherein said ion exchanger comprises ion exchange nonwoven fabric or fibers.

12. A gas removal filter according to claim 7, wherein said electrodes are made of an evaporated film of electrically conductive material or a coated film of electrically conductive paste.

13. A gas removal apparatus having a gas removal filter according to claim 6.

14. A clean room having a gas removal filter according to claim 6.

15. A clean box having a gas removal filter according to claim 6.

16. An apparatus for measuring a service life of a gas removal filter, comprising:

a measuring unit for measuring an electric resistance of a gas removal filter having an ion exchanger;

a measuring unit for measuring a temperature and/or a humidity of a gas which passes through said gas removal filter; and a controller for calculating said electric resistance, the temperature and/or the humidity, and known detected data to estimate an ion exchange group consumption ratio or an ion exchange capacity of the gas removal filter.

17. An apparatus according to claim 16, further comprising:

communication means for communicating said ion exchange group consumption ratio or said ion exchange capacity with an external device.

18. A semiconductor fabrication apparatus having an apparatus according to claim 16.

19. A liquid crystal substrate fabrication apparatus having an apparatus according to claim 16.

20. A substrate storage apparatus having an apparatus according to claim 16.

* * * * *